United States Patent Office 2,819,756
Patented Jan. 14, 1958

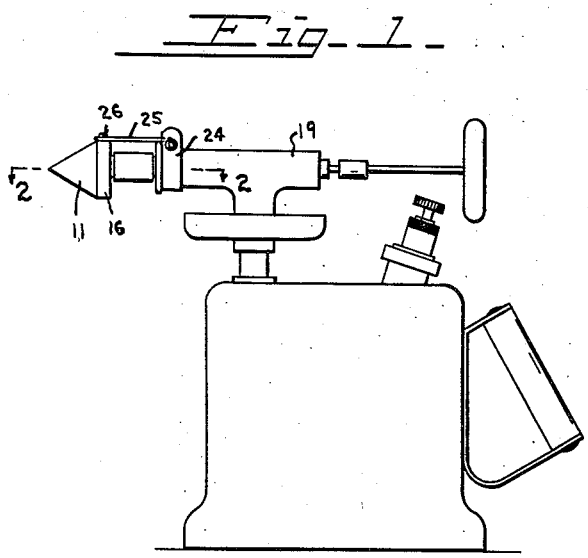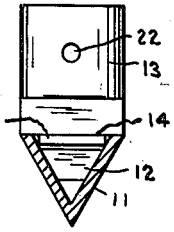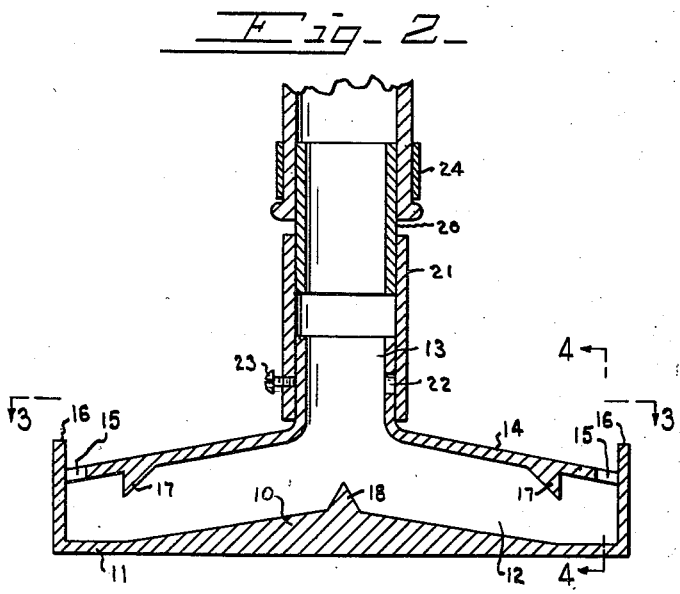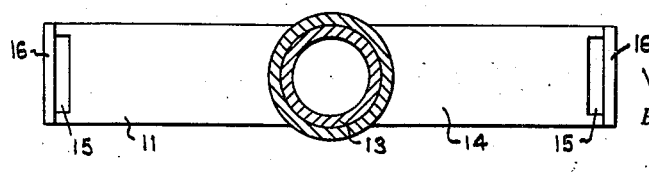
INVENTOR.
WILLARD E. SCHMIDT.
BY
ATTORNEY.

2,819,756
PUTTY REMOVER
Willard E. Schmidt, Bellevue, Ky.
Application July 7, 1955, Serial No. 520,503
1 Claim. (Cl. 158—13.6)

My improved device has for its purpose means to heat and soften the putty holding window panes in place for easy removal of the putty. The device is also capable of being used to melt the lead on leaded windows, to heat painted surfaces for the removal of the paint, or it can be used to spread solder.

My improved device is designed to be attached to an ordinary blow torch or to a tank of propane gas.

The object of my invention is to provide a triangular heat chamber attachable to a hot flame producing device whereby the elongated triangular forward surface is heated to a sufficient degree, and when used to remove putty, will soften the putty but will prevent burning the wood or cracking the window pane.

A further object is to provide baffles in the heat chamber to divert the hot flame to both ends of the unit.

My invention will be further readily understood from the following description and claim, and from the drawings, in which latter:

Fig. 1 is a side view of an ordinary blow torch with my device attached thereto.

Fig. 2 is a horizontal section of my improved device, taken in the plane of the line 2—2 of Fig. 1.

Fig. 3 is a sectional view, taken in the plane of the line 3—3 of Fig. 2.

Fig. 4 is a sectional view, taken in the plane of the line 4—4 of Fig. 2.

My improved device comprises a triangular elongated housing 11 having a hollow interior 12 and provided with a tubular extension 13. The rear face 14 of the housing is provided with vents 15 adjacent to extensions 16 on the ends of the housing. Spaced inwardly from the vents 15 within the hollow housing 12 are baffles 17. A baffle 18 extends inwardly from the central portion of the heavy section 10 of the housing to divert the hot flame produced by the blow torch 19 to both ends of the housing. This section 10 is heavy at the central point and recedes toward each end to evenly distribute the heat from the flame to the surface of the elongated housing 11. Baffles 17 deflect the hot flame to the forward corners of the housing. Suitable connectors 20 and 21 are provided as adapters to attach the device to the open end of the blow torch. However, these adapters may be of various shapes and sizes to fit torches of various sizes or other hot flame producing devices.

In the present exemplification I have shown the device attached to an ordinary blow torch, and with the adapters 20 and 21, the extension 13 is pulled forward permitting the torch to be lighted through the aperture 22. The device is then pushed rearwardly into the adapter 21 and the screw 23 tightened to hold the device in the adapter. A clamping band 24 is provided around the neck of the blow torch and has a hooked member 25 attached to the housing by a screw 26 for holding the device in position.

After the torch has been lighted, the flame will spread throughout the housing being vented by the vents 15 and causes the forward angular faces of the housing to become heated sufficiently to soften the putty for easy removal thereof. The end member 16 protects any surface which might otherwise come in contact with the vents and become scorched.

Having thus fully described my invention, which I claim as new and desire to secure by Letters Patent is:

A device for softening putty comprising in combination an elongated housing of V formation having an internal triangular chamber, the forward internal face of said chamber having a heavy central section receding to the ends of said chamber, a tubular extension extending centrally from the rear face of said triangular chamber, a baffle extending rearwardly from said heavy section central of said tubular extension for diverting a flame projected through said tubular extension along said receding internal face, vents in the rear face of said chamber adjacent to the ends thereof for dispersal of the flame, baffles in advance of said vents to divert the hot flame to the forward receding face of said chamber, and extensions on the rear face of said housing at the ends thereof to protect the surface adjacent to the surface being treated from the heat of said flame.

References Cited in the file of this patent
UNITED STATES PATENTS

| | | |
|---|---|---|
| 623,670 | Hutchinson | Apr. 25, 1899 |
| 703,567 | France | July 1, 1902 |
| 880,048 | Stein | Feb. 25, 1908 |
| 1,831,799 | Anderson | Nov. 17, 1931 |
| 2,692,641 | Woods | Oct. 26, 1954 |